United States Patent
Ha (10) Patent No.: US 6,205,189 B1
(45) Date of Patent: Mar. 20, 2001

(54) DIGITAL AUTOMATIC GAIN CONTROL METHOD AND DEVICE FOR USE IN COMMUNICATION TERMINAL OF MOBILE RADIO COMMUNICATION SYSTEM

(75) Inventor: Ji-Won Ha, Koyang (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/929,470

(22) Filed: Sep. 15, 1997

(30) Foreign Application Priority Data

Sep. 13, 1996 (KR) ................................................ 96/39867

(51) Int. Cl.[7] .................................................. H04L 27/08
(52) U.S. Cl. .................. 375/345; 455/232.1; 455/234.1; 455/234.2
(58) Field of Search .............................. 375/345; 455/127, 455/226.2, 226.4, 232.1, 234.1, 234.2

(56) References Cited

U.S. PATENT DOCUMENTS

| | | | |
|---|---|---|---|
| 5,107,225 | * | 4/1992 | Wheatley, III et al. .............. 330/279 |
| 5,161,170 | * | 11/1992 | Gilbert et al. ......................... 375/98 |
| 5,168,505 | * | 12/1992 | Akazawa et al. ..................... 375/200 |
| 5,257,283 | | 10/1993 | Gilhousen et al. ................... 375/200 |
| 5,361,395 | * | 11/1994 | Yamamoto ........................... 455/33.2 |
| 5,457,813 | * | 10/1995 | Poutanen ................................ 455/70 |
| 5,548,616 | * | 8/1996 | Mucke et al. ......................... 375/295 |
| 5,566,201 | * | 10/1996 | Ostman ................................. 375/200 |
| 5,603,113 | * | 2/1997 | De Loe, Jr. ......................... 455/234.1 |
| 5,627,857 | * | 5/1997 | Wilson .................................. 375/219 |
| 5,687,195 | * | 11/1997 | Hwang et al. ........................ 375/345 |
| 5,959,980 | * | 9/1999 | Scott .................................... 370/280 |

* cited by examiner

Primary Examiner—Stephen Chin
Assistant Examiner—Dae V. Ha
(74) Attorney, Agent, or Firm—Robert E. Bushnell, Esq.

(57) ABSTRACT

A digital automatic gain control device for use in a communication terminal of a mobile radio communication system employing a time-division duplex (TDD) transmission. A transmission power amplifier and a reception amplifier, which constitute the communication terminal, are fully composed of digital elements. In a transmission mode, a reception data latch is cleared to turn off the reception amplifier, so as to prevent a distortion of a modulated transmission signal due to regeneration and coupling of a modulated transmission waveform generated from a receiver. On the contrary, in a reception mode, a transmission data latch is cleared to prevent the carrier generated from the transmitter from being leaked toward a receiver, thereby preventing deterioration of a reception sensitivity of the receiver. Therefore, the transmission and reception gain can be accurately controlled based on the accurate timing control by the control processor.

15 Claims, 7 Drawing Sheets

DIGITAL AUTOMATIC GAIN CONTROL METHOD AND DEVICE FOR USE IN COMMUNICATION TERMINAL OF MOBILE RADIO COMMUNICATION SYSTEM

CLAIM OF PRIORITY

This application makes reference to, incorporates the same herein, and claims all benefits accruing under 35 U.S.C §119 from an application entitled Digital Automatic Gain Control Method And Device For Use In Communication Terminal Of Mobile Radio Communication System earlier filed in the Korean Industrial Property Office on Sep. 13, 1996, and there duly assigned Serial No. 96-39867 by that Office.

BACKGROUND OF THE INVENTION

1. Field of the Invention

The present invention relates to a band spread radio communication system, and more particularly to an automatic gain control method and device for use in a communication terminal of a mobile radio communication system employing a time-division duplex (TDD) transmission.

2. Description of the Related Art

In a conventional mobile radio communication system employing a time-division duplex (TDD) transmission, a mobile station automatically controls a gain of a transmitter/receiver in a communication terminal, in order to prevent a deterioration of the system performances due to a mutual interference with another mobile station. The time-division duplex transmission refers to a bidirectional transmission for periodically (e.g., 1msec) switching a channel to a transmission mode and a reception mode. A mobile station controls a gain of a transmission power amplifier disposed in a transmitter based on a mobile station transmission power control command included in a received frame from a base station, in order to maintain an appropriate transmission power during a transmission mode. Further, the mobile station appropriately controls a gain of a reception amplifier in order to compensate for an attenuation of a reception power according to a distance from the base station, during a reception mode.

Conventionally, the gains of the transmission power amplifier and the reception amplifier are controlled by an analog automatic gain control method in which the gain is controlled according to an intensity of a received signal. Such a prior art method is well disclosed in U.S. Pat. No. 5,257,283, issued on Oct. 26, 1993, by Klein S. Gilhousen, el al., entitled Spread Spectrilm Transismitter Power Control Method And System.

Figure 1:
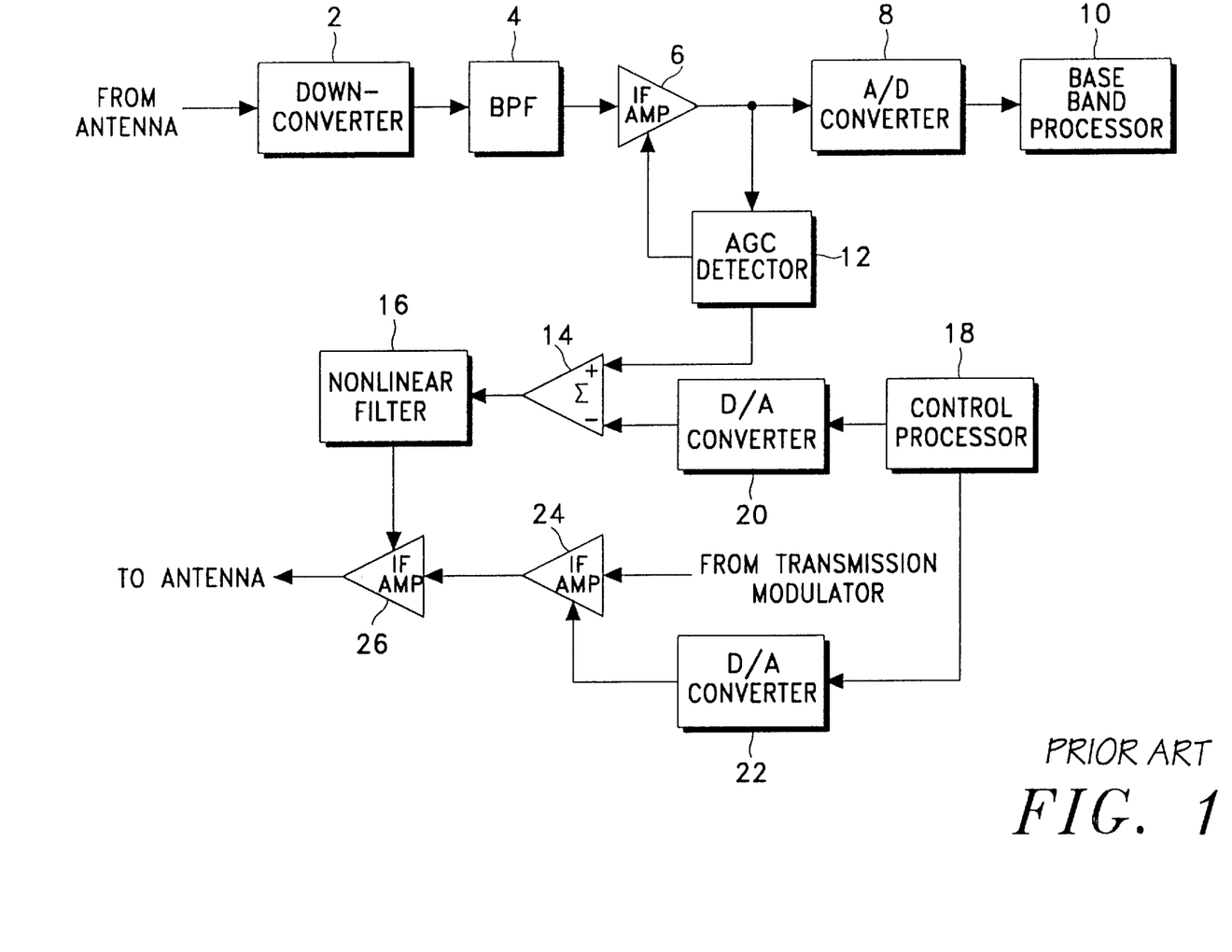
FIG. 1 is a block diagram of a prior art analog automatic gain control system for use in a mobile radio communication system.

Referring to FIG. 1, which is described in the U.S. Pat. No. 5,257,283 patent, there is illustrated a block diagram of an analog automatic gain control system for use in a mobile radio communication system. As illustrated, a signal received from an antenna is transferred to an intermediate frequency amplifier (IF AMP) 6 via a down-converter 2 and a band pass filter (BPF) 4. An output of intermediate frequency amplifier 6 is applied to a base band processor 10 via an analog-to-digital (A/D) converter 8, and also applied to an automatic gain control (AGC) detector 12. Automatic gain control detector 12 has a double function. First, in the reception mode, automatic gain control detector 12 generates a control voltage for controlling a gain of intermediate frequency amplifier 6 to maintain a constant level of the received signal. Second, in the transmission mode, an output of automatic gain control detector 12 is compared with a reference power level value generated from a control processor 18, in order to control a transmission power based on a value set by a transmission signal from the base station. A comparator 14 compares the output of the automatic gain control detector 12 with the reference power level value received from control processor 18 via a digital-to-analog (D/A) converter 20. An output of comparator 14 is applied to a nonlinear filter 16 which has a nonlinear output characteristic with respect to a variation of the output of comparator 14. The output characteristic of nonlinear filter 16 sets an increasing rate of the transmission power control voltage to a value lower than a decreasing rate thereof, in order to prevent the deterioration of the system performances due to a rapid increase of the transmission power. In the meantime, an intermediate frequency amplifier 24 controls a signal generated from a transmission modulator (not shown) based on a control signal generated from control processor 18 via a digital-to-analog converter 22, in the transmission mode of the mobile station. Digital-to-analog converter 22 generates the control signal for controlling a gain of intermediate frequency amplifier 24. An output signal from intermediate frequency amplifier 24 is applied to an intermediate frequency amplifier 26. Since a gain of intermediate frequency amplifier 26 is controlled by an output of nonlinear filter 16, a transmission is signal output of intermediate frequency amplifier 26 is automatically controlled.

It is noted from the foregoing description that the prior art analog automatic gain control system includes the automatic gain control detector 12 for detecting an intensity of the received signal. However, it is difficult to form automatic gain control detector 12 at a broad variation range of a reception power level. Further, there is needed an additional means for converting an output level of automatic gain control detector 12 into a proper control voltage range for controlling the gain of intermediate frequency amplifier 6. Moreover, the prior art analog automatic gain control system needs comparator 14 for comparing the control signal output from control processor 18 with the output value of automatic gain control detector 12 in order to control the transmission power during the transmission and reception modes. However, as being composed of analog elements, comparator 14 is sensitive to noise so that a response time may be limitative. Therefore, it is not easy to accurately control the output of comparator 14. Besides, the prior art analog automatic gain control system needs digital-to-analog converter 20 for converting the digital signal output from control processor 18 into the analog value to supply the analog value to comparator 14. However, a low conversion speed of digital-to-analog converter 20 becomes a main cause that delays the response time of the automatic gain control system. In particular, in case that the signal that the mobile station has received is a burst signal, it is difficult to control the gain in order to maintain a constant received signal level through one data frame interval. Further, it is not easy to realize nonlinear filter 16 in the light of its features. In order for nonlinear filter 16 to control the gain of intermediate frequency amplifier 26, there is needed an additional circuit, i.e., a level converter for converting an output level of nonlinear filter 16 within a gain variable control voltage range of intermediate frequency amplifier 26. However, although the level converter is additionally used, it is still not easy to constitute nonlinear filter 16 in the light of its nonlinear output characteristic. It should be noted that all the problems mentioned above are mainly caused because the prior art system employs the analog automatic gain control method.

SUMMARY OF THE INVENTION

It is therefore an object of the present invention to provide a digital automatic gain control method and device for controlling a gain of a communication terminal of a mobile radio communication system.

It is another object of the present invention to provide a method for easily realizing a digital automatic gain control device for controlling a transmission/reception gain of a communication terminal of a mobile communication system.

It is still another object of the present invention to provide a digital automatic gain control method and device capable of performing an automatic gain control based on an accurate timing control.

According to an aspect of the present invention, a digital automatic gain control device for use in a transmitting/receiving terminal of a mobile radio communication system includes, a transmission power amplifier disposed in a transmitter and a reception amplifier disposed in a receiver, gains of the transmission amplifier and reception amplifier being digitally controlled; a control processor for generating a gain control signal of a next frame based on mobile station transmission power level information included in a signal received from a base station, and generating a plurality of timing signals for controlling gains of the transmission power amplifier and the reception amplifier; a received signal strength indication detector for detecting a received signal strength indication applied from the receiver; an analog-to-digital converter for converting the received signal strength indication into a digital signal based on a timing signal generated from the control processor; a transmission gain control code mapping device for mapping a transmission gain control signal of the next frame into a transmission gain control code; a reception gain control code mapping device for mapping an output from the analog-to-digital converter into a reception gain control code; a selection controller for generating a selection control signal for selecting one of a transmission mode and a reception mode, based on a timing signal generated form the control processor; a selector for selecting one of the transmission gain control code and the reception gain control code, based on the selection control signal; a timing controller for generating timing control signals according to the transmission mode and reception mode, based on the timing signals generated from the control processor; and a transmission data latch and a reception data latch for respectively providing the transmission power amplifier and the reception amplifier with the transmission gain control code and the reception gain control code selected at the selector based on the timing control signal.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described in detail hereinbelow, and it should be clearly understood that many specifics such as the detailed circuit elements are shown only by way of an example to bring a better understanding of the present invention and the present invention may be embodied without those specifics. Moreover, it should be noted that detailed descriptions on the related prior art may be intentionally omitted if it is believed to be unnecessary in describing the concepts of the present invention.

Figure 2:
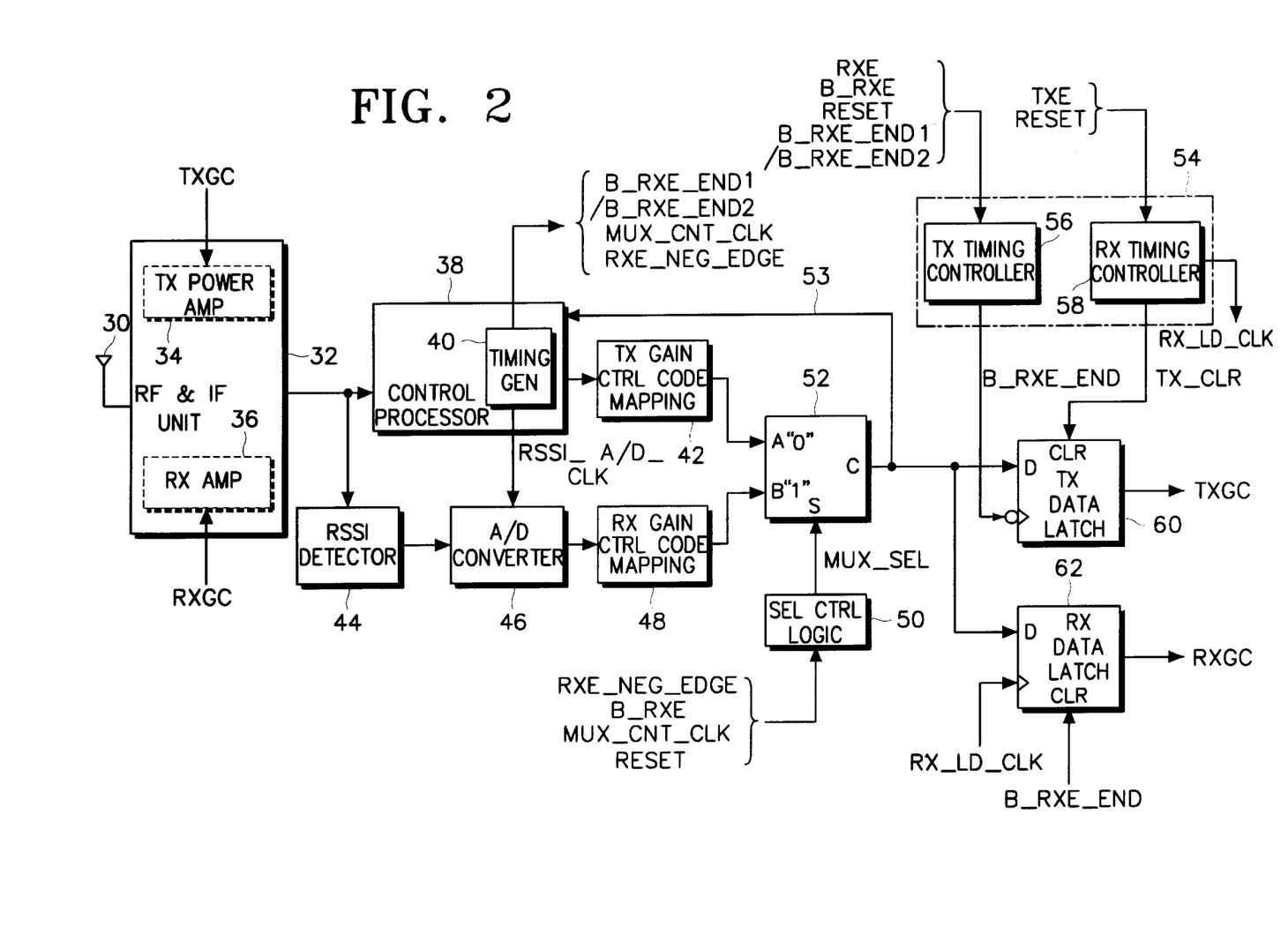
FIG. 2 is a block diagram of a digital automatic gain control device according to a preferred embodiment of the present invention.

Unlike the device adopting the analog automatic gain control method shown in FIG. 1, a transmission power amplifier 34 and a reception amplifier 36 in a RF (radio frequency) & IF (intermediate frequency) unit 32 shown in FIG. 2 according to the present invention are realized by a digital control gain variable amplifier which is controllable by a digital control signal. In this manner, it is possible to easily and accurately control a transmission/reception power. Further, although the prior art device needs nonlinear filter 16 for controlling intermediate frequency amplifier 26 to control the transmission power as shown in FIG. 1, a device according to the present invention eliminates the above mentioned structure and includes a control processor 38 which takes the place of the conventional nonlinear filter 16, as shown in FIG. 2. Accordingly, it is possible to remove the difficulty in realizing the analog nonlinear filter.

Referring to FIG. 2, there is illustrated a digital automatic gain control device according to an embodiment of the present invention. As illustrated, RF & IF unit 32 is connected to an antenna 30 and includes transmission power amplifier 34 which is a digital gain control variable amplifier which is controllable by a digital control signal, and reception amplifier 36. A control processor 38 sets a transmission power level of a mobile station based on mobile station transmission power level control information transmitted from a base station to control a transmission power level of a mobile station during a transmission mode, and generates a digital gain control signal for varying a gain of transmission power amplifier 34 to allow the mobile station to transmit a next frame with the set transmission power level. Further, control processor 38 sets a gain of reception amplifier 36, which is required when receiving a next frame after one frame is received in a reception mode. Control processor 38 includes a timing generator 40 for generating various timing signals required for transmitting and receiving the signal.

A transmission gain control code mapping device 42 maps a digital transmission gain control signal generated from the control processor 38 into a transmission gain control code for varying the gain of transmission power amplifier 34 and the gain of reception amplifier 36.

A received signal strength indication (RSSI) detector 44 detects a received signal strength indication (RSSI) from a frame received from RF & IF unit 32. An analog-to-digital converter 46 converts the received signal strength indication RSSI into a digital signal in synchronism with a clock RSSI_A/D_CLK generated from timing generator 40. The digital signal output from analog-to-digital converter 46 is a digital gain control signal for varying the gain of reception amplifier 36. A reception gain control code mapping device 48 maps a digital gain control signal generated from analog-to-digital converter 46 into a reception gain control code for varying the gain of reception amplifier 36.

A multiplexer 52 multiplexes the digital gain control codes received respectively from transmission gain control code mapping device 42 and reception gain control code mapping device 48, based on a selection signal MUX_SEL generated from a selection control logic circuit 50. That is, multiplexer 52 selectively outputs one of the digital transmission and reception gain control codes, based on the selection control signal MUX_SEL.

An output of multiplexer 52 is coupled to a transmission data latch 60, a reception data latch 62, and control processor 38. An output line 53 connected to control processor 38 is to feed the digital transmission control code generated from transmission gain control code mapping device 42 back to control processor 38, to transmit a next frame with the gain value of transmission power amplifier 34 which is set during transmitting a preceding frame, in case that the frame transmitted from the base station to the mobile station does not include a gain control signal (i.e., transmission power level control information) of transmission power amplifier 34.

A timing controller 54 includes a transmission timing controller 56 and a reception timing controller 58. Timing controller 54 controls a transmission/reception timing so as to apply the digital transmission and reception gain control codes to transmission power amplifier 34 and reception amplifier 36 respectively, based upon various timing signals generated from timing generator 40 and control processor 38.

A transmission data latch 60 is composed of a plurality of (e.g., four) flip-flops, and latches the output of multiplexer 52 based on a transmission timing control of timing controller 54 to apply the transmission gain control code TXGC with predetermined bit numbers (e.g., four bits) to transmission power amplifier 34. A reception data latch 62 is composed of a plurality of (e.g., four) flip-flops, and latches the output of multiplexer 52 based on a reception timing control of timing controller 54 to apply the reception gain control code RXGC with predetermined bit numbers (e.g., four bits) to reception amplifier 36.

Now, descriptions will be made on operations of the digital automatic gain control device according to the present invention with reference to FIGS. 2 through 7.

First, referring to FIG. 2, in a mobile radio communication system employing the TDD transmission, a one-frame received through antenna 30 is frequency-converted and amplified at RF & IF unit 32, and applied to control processor 38 and RSSI detector 44. It should be noted that the received one-frame is also applied to reception amplifier 36 in RF & IF unit 32.

Control processor 38 extracts transmission power level control information of the mobile station from the received one-frame, to set a transmission power level of the mobile station according thereto. Further, control processor 38 provide transmission gain control code mapping device 42 with a digital transmission gain control signal for varying the gain of transmission power amplifier 34, to allow the mobile station to transmit a next frame with the set transmission power level. Then, transmission gain control code mapping device 42 maps the digital transmission gain control signal into the transmission gain control code.

Further, timing generator 40 in control processor 38 generates various timing signals related to a transmission/reception gain control. A detailed circuit diagram of timing generator 40 is illustrated in FIG. 6.

Figure 6:
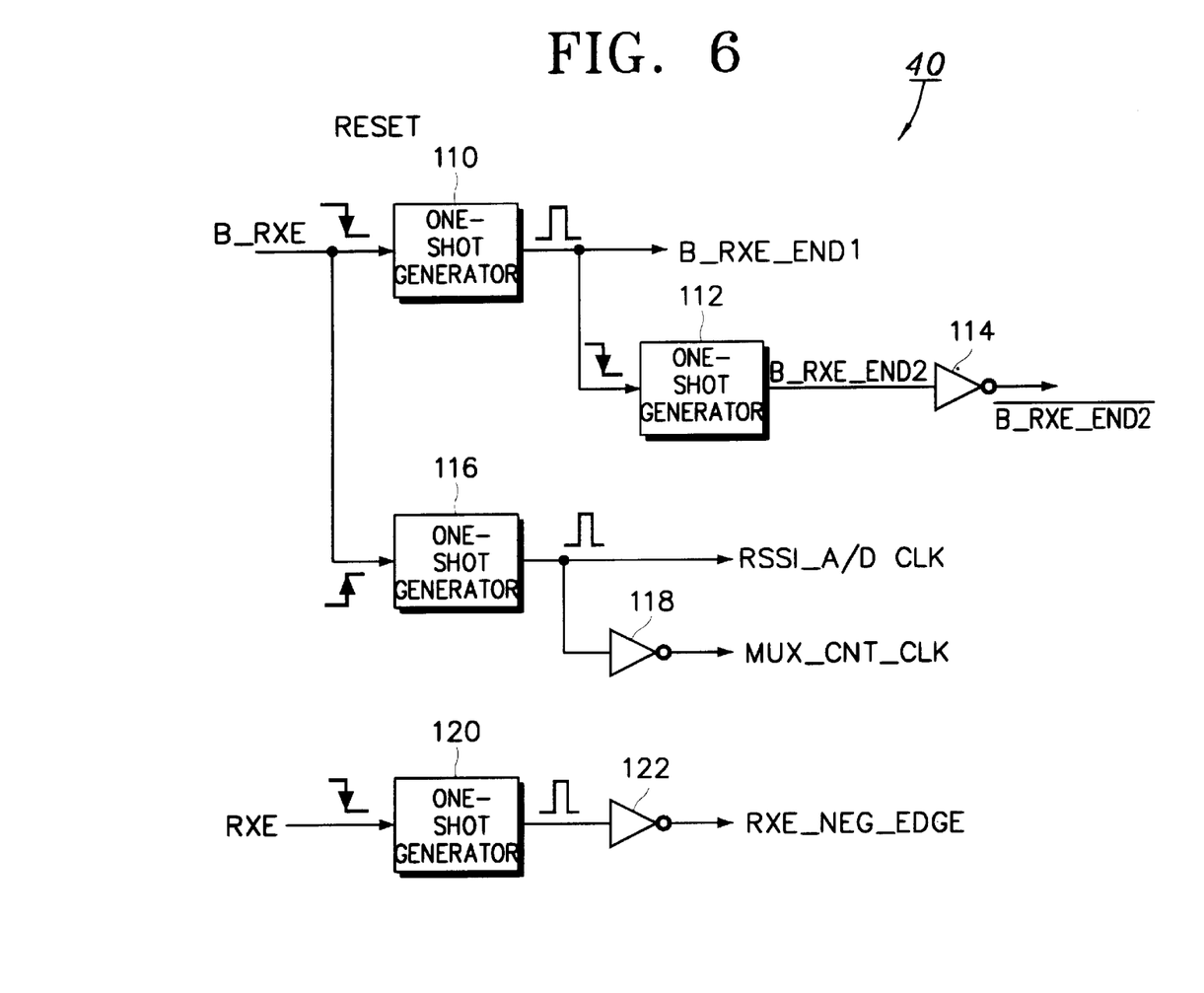
FIG. 6 is a detailed circuit diagram of a timing generator of FIG. 2.
Figure 7:
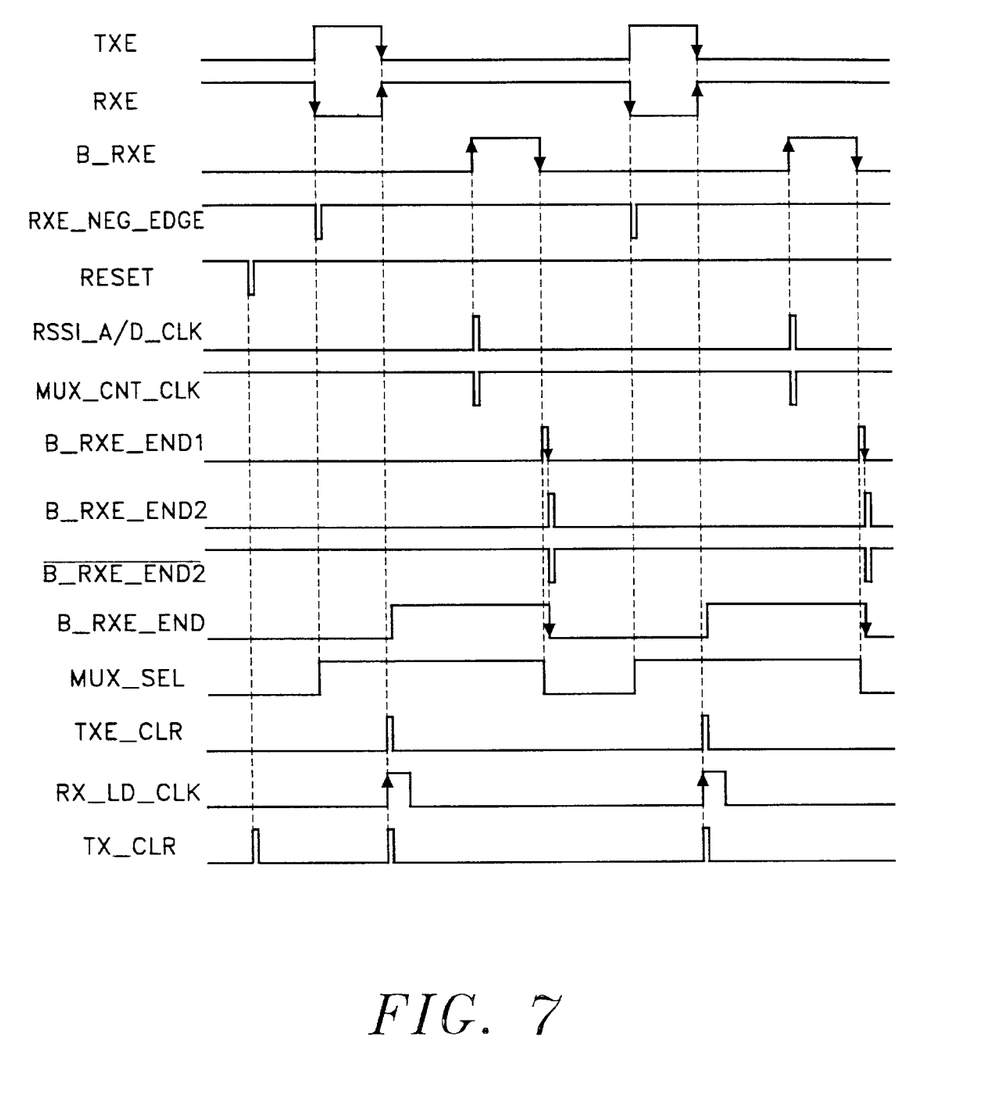
FIG. 7 is a diagram for showing waveforms at various parts of FIG. 2 according to a preferred embodiment of the present invention.

Referring to FIGS. 2, 6 and 7, in the reception mode, control processor 38 provides the timing generator 40 with a receive enable signal RXE and a receive recognition signal B_RXE for informing a receiving interval of the received one-frame. The receive recognition signal B_RXE shown in FIG. 7 is applied to one-shot generators 110 and 116 shown in FIG. 6. Then, the one-shot generator 110 generates a one-shot signal B_RXE_END1 at a falling edge of the receive recognition signal B_RXE, and one-shot generator 116 generates a one-shot signal RSSI_A/D_CLK at a rising edge of the receive recognition signal B_RXE. The one-shot signal B_RXE_END1 generated from one-shot generator 110 is a signal for informing an end of the received one-frame. A one-shot generator 112 generates a one-shot signal B_RXE_END2 at a falling edge of the one-shot signal B_RXE_END1, which is inverted to an inversion one-shot signal $\overline{\text{B\_RXE\_END2}}$ by an inverter 114. The inversion one-shot signal $\overline{\text{B\_RXE\_END2}}$ is applied to transmission timing controller 56.

The one-shot signal RSSI_A/D_CLK generated from one-shot generator 116 is a clock signal for activating analog-to-digital converter 46. An inverter 118 inverts the one-shot signal RSSI_A/D_CLK generated from one-shot generator 116 to generate a signal MUX_CNT_CLK, which is applied to selection control logic circuit 50.

Further, one-shot generator 120 of timing generator 40 receives the receive enable signal RXE, to generate a one-shot signal at a falling edge of the receive enable signal RXE. An inverter 122 inverts the one-shot signal output from one-shot generator 120 to generate an inversion one-shot signal RXE_NEG_EDGE.

Referring back to FIG. 2, RSSI detector 44 detects the received signal strength indication RSSI from the received one-frame generated from RF & IF unit 32, and provides it to analog-to-digital converter 46. A signal intensity of the receive one-frame, i.e., the received signal strength indication RSSI of the one-frame can be determined even before the one-frame is completely received. Analog-to-digital converter 46 converts the received signal strength indication RSSI from RSSI detector 44 into a digital signal, in synchronism with the clock RSSI_A/D_CLK generated from the timing generator 40. It can be understood from FIG. 7 that an interval at which analog-to-digital converter 46 generates the received signal strength indication RSSI in synchronism with the clock RSSI_A/D_CLK ranges from a start timing of the one-frame to the one-shot pulse interval. The digital signal generated from analog-to-digital converter 46 is a digital gain control signal for varying the gain of reception amplifier 36. Reception gain control code mapping device 48 maps the digital reception gain control signal generated from analog-to-digital converter 46 into the reception gain control code for varying the gain of reception amplifier 36.

Multiplexer 52 multiplexes the digital control codes generated respectively from transmission gain control code mapping device 42 and reception gain control code mapping device 48, based on the selection control signal MUX_SEL of FIG. 7. The selection control signal MUX_SEL is generated from selection control logic circuit 50 and applied to a selection terminal S of multiplexer 52. Selection control logic circuit 50 is illustrated in detail in FIG. 3.

Figure 3:
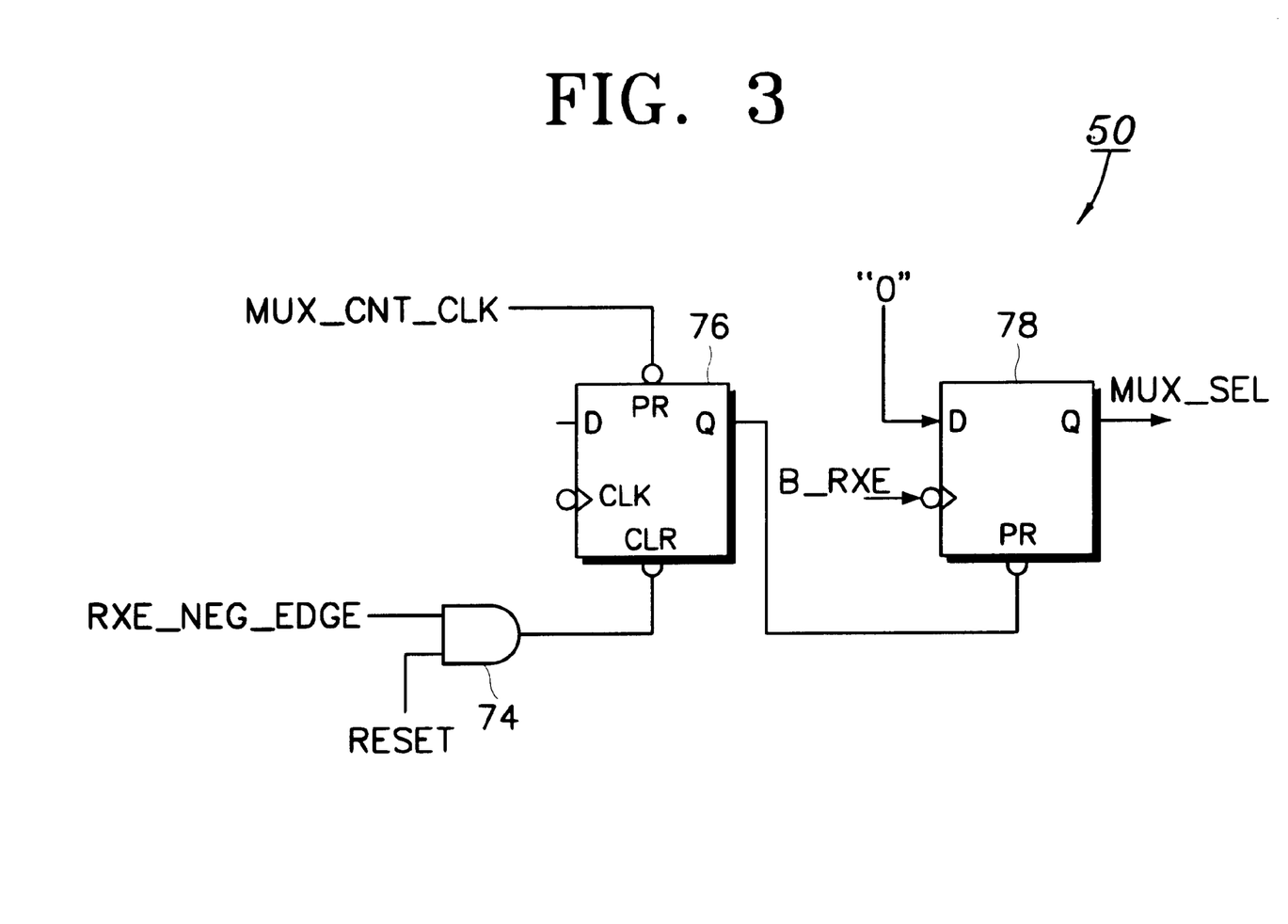
FIG. 3 is a detailed circuit diagram of a selection control logic circuit of FIG. 2.

Referring to FIG. 3, selection control logic circuit 50 receives the signal MUX_CNT_CLK from control processor 38, the signal RXE_NEG_EDGE from timing generator 40, the signal B_RXE generated from control processor 38 during the reception mode, and a reset signal RESET generated upon a power-up. The signal RXE_NEG_EDGE shown in FIG. 7 is ANDed with the reset signal RESET at an AND gate 74 and applied to a D flip-flop 76 at a clear terminal CLR. D flip-flop 76 is cleared at a falling edge of the signal RXE_NEG_EDGE. Then, the "low" state output from D flip-flop 76 is applied to a D flip-flop 78 at a preset terminal PR. D flip-flop 78 is preset in response to the "low" state applied to preset terminal PR thereof, thereby generating the "high" state. In the meantime, D flip-flop 78 generates the "low" state at the falling edge of the signal B_RXE. The output of D flip-flop 78 becomes the selection control signal MUX_SEL which is applied to selection terminal S of multiplexer 52. The waveform of the selection control signal MUX_SEL generated from D flip-flop 78 is illustrated in FIG. 7.

Referring again to FIG. 2, the output of multiplexer 52 is set to one of the transmission and reception modes before a next frame is transmitted or received, based on the selection control signal MUX_SEL. Namely, multiplexer 52 selectively generates the reception gain control code from reception gain control code mapping device 48 in response to the selection control signal MUX_SEL of the logic "high" state (i.e. the reception mode), and selectively generates the transmission gain control code from transmission gain control code mapping device 42 in response to the selection control signal MUX_SEL of the logic "low" state (i.e. the transmission mode).

The output of multiplexer 52 is coupled to transmission data latch 60, reception data latch 62, and control processor 38. Output line 53 connected to control processor 38 is to feed the digital control code output from transmission gain control code mapping device 42 back to control processor 38, to transmit a next frame with the gain value of transmission power amplifier 34 which is set during transmitting a preceding frame, in case that the frame transmitted from the base station to the mobile station does not include a gain control signal (i.e., transmission power level control information) of transmission power amplifier 34. The output of multiplexer 52 is commonly applied to transmission data latch 60 and reception data latch 62.

Transmission data latch 60 which is composed of four-input flip-flops (e.g., MC14175B) latches the output of multiplexer 52 based on the transmission timing control of timing generator 54, and applies the transmission gain control code of predetermined bit numbers (e.g., four bits) to transmission power amplifier 34. Similarly, reception data latch 62 which is composed of four-input flip-flops (e.g., MC14175B) latches the output of multiplexer 52 based on the reception timing control of timing generator 54, and applies the reception gain control code of predetermined bit numbers (e.g., four bits) to reception amplifier 36.

Timing generator 54 includes transmission timing controller 56 for controlling a transmission timing of transmission data latch 60, and reception timing controller 58 for controlling a reception timing of reception data latch 62. Transmission timing controller 56 and reception timing controller 58 are illustrated in detail in FIGS. 4 and 5, respectively.

Figure 4:
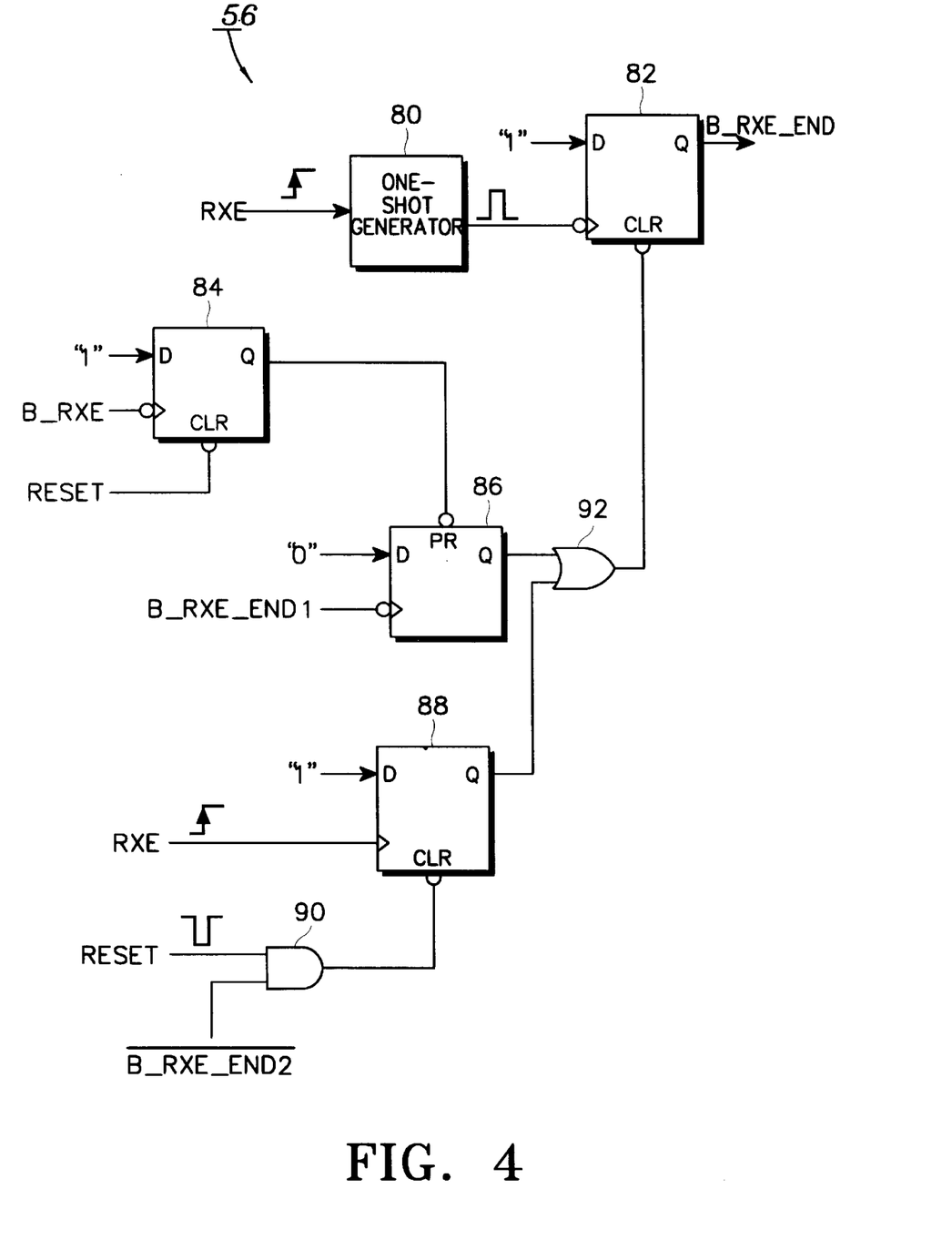
FIG. 4 is a detailed circuit diagram of a transmission timing controller of FIG. 2.

First, referring to FIG. 4, transmission timing controller 56 applies the signal B_RXE_END, shown in FIG. 7, for informing an end of the receive recognition signal to a clock input terminal of transmission data latch 60 and a clear terminal CLR of reception data latch 62. The signal B_RXE_END is generated from transmission timing controller 56.

A one-shot generator 80 of transmission timing generator 56 generates a one-shot signal at a rising edge of the receive enable signal RXE and applies the one-shot signal to a clock terminal of a D flip-flop 82. Then, D flip-flop 82 generates a signal B_RXE_END of the "high" state, as shown in FIG. 7. A D flip-flop 84 is cleared in response to a reset signal RESET and then applies the logic "low" state to a preset terminal PR of a D flip-flop 86. Then, D flip-flop 86 maintains the "high" state output. In the meantime, if the signal B_RXE is applied to a clock terminal of D flip-flop 84, D flip-flop 84 will generate the logic "high" state. Consecutively, D flip-flop 86 latches the ground voltage "0" coupled to an input terminal D thereof at a falling edge of the signal B_RXE_END1 generated from timing generator 40. Thus, D flip-flop 86 applies the logic "low" state to an input end of an OR gate 92. Further, the reset signal RESET and the signal $\overline{B\_RXE\_END2}$ are ANDed by an AND gate 90, and applied to a clear terminal CLR of a D flip-flop 88. Then, D flip-flop 88 generates the logic "low" state in response to the reset signal RESET or the signal $\overline{B\_RXE\_END2}$ of the logic "low" state. OR gate 92 ORs the outputs of D flip-flops 86 and 88, to generate an output thereof to a clear terminal CLR of D flip-flop 82. If the output of OR gate 92 is at the logic "low" state, the output signal B_RXE_END from D flip-flop 82 will be at the logic "low" state. With reference to FIGS. 4 and 7, the signal B_RXE_END goes to the logic "low" state, when the signal B_RXE_END1 is applied to D flip-flop 86 or when the signal $\overline{B\_RXE\_END2}$ is applied to D flip-flop 88. The signal B_RXE_END generated from transmission timing generator 56 is commonly applied to the clock terminal of transmission data latch 60 and the clear terminal CLR of reception data latch 62.

Figure 5:
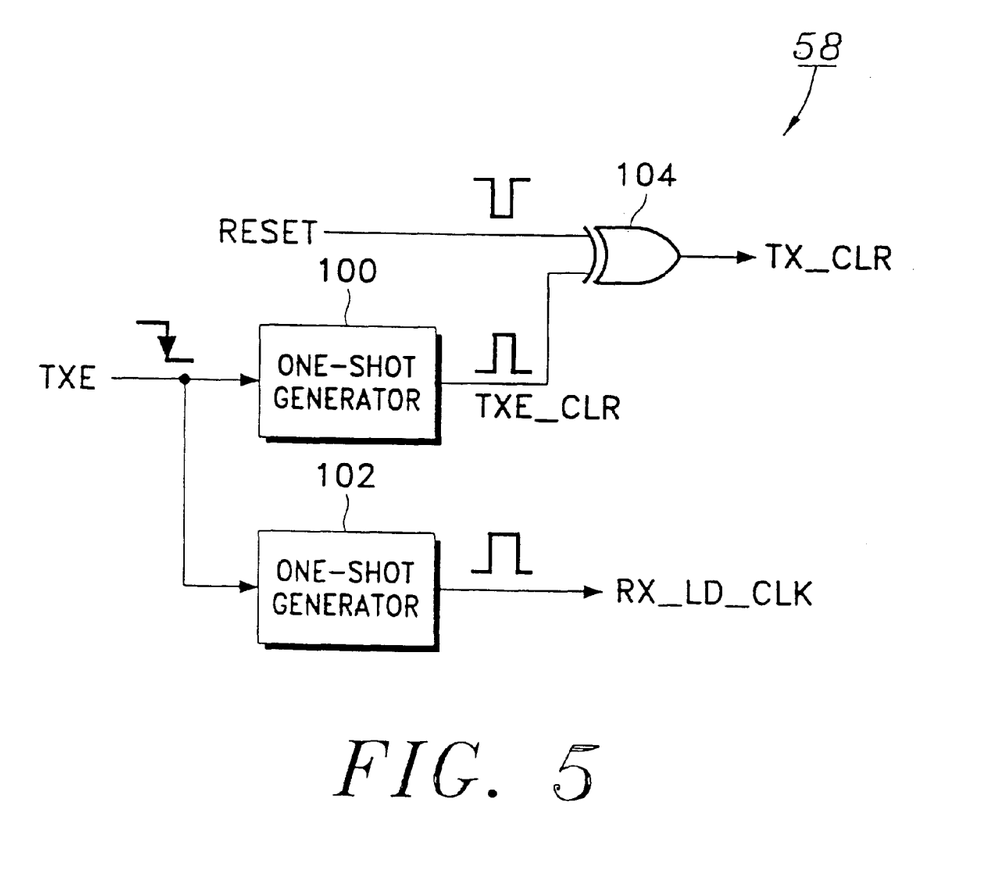
FIG. 5 is a detailed circuit diagram of a reception timing controller of FIG. 2.

Next, referring to FIG. 5, reception timing controller 58 includes one-shot generators 100 and 102 for respectively generating one-shot signals TXT_CLR and RX_LD_CLK at a falling edge of a transmission enable signal TXE. As shown in FIG. 7, the output signal RX_LD_CLK of one-shot generator 102 has a wider pulse width than that of the output signal TXE_CLR of one-shot generator 100. The output of one-shot generator 102 is a reception load clock signal RX_LD_CLK shown in FIG. 7. The one-shot signal, i.e., the transmission enable clear signal TXE_CLR, generated from one-shot generator 100 is exclusively ORed with the reset signal RESET by an exclusive OR gate (XOR) 104, thereby generating a transmission clear signal TX_CLR. The reception load clock signal RX_LD_CLK and the transmission clear signal TX_CLR generated from reception timing generator 58 are applied to the clock terminal of reception data latch 62 and the clear terminal CLR of transmission data latch 60, respectively.

Referring back again to FIG. 2, descriptions will now be made on operations of transmission data latch 60 and reception data latch 62. First, reception data latch 62 receives the reception gain control code from reception gain control code mapping device 48 via multiplexer 52, in the reception mode (MUX_SEL="1"). Further, reception data latch 62 latches the reception gain control code RXGC at a rising edge of the receiving load clock RX_LD_CLK, to apply the reception gain control code RXGC to reception amplifier 36. The reception gain control code according to the present invention is composed of four bits. In the meantime, reception data latch 62 is cleared at a falling edge of the signal B_RXE_END applied to the clear terminal CLR thereof. Then, reception amplifier 36 is turned off.

It is illustrated in FIG. 7 that the signal B_RXE_END maintains the logic "high" state even after an inactivation of the signal B_RXE, until the signal $\overline{B\_RXE\_END2}$ goes to the "low" state, so as not to load the transmission gain control code TXGC on transmission power amplifier 34 until the received one-frame is completely processed.

Next, transmission data latch 60 receives the transmission gain control code from transmission gain control code mapping device 42 via multiplexer 52, in the transmission mode (MUX_SEL="0"). Further, transmission data latch 60 latches the transmission gain control code TXGC while the signal B_RXE_END is at the logic "low" state, to apply the transmission gain control code TXGC to transmission power amplifier 34. The transmission gain control code according to the present invention is composed of four bits. In the meantime, transmission data latch 60 is cleared in response to the transmission clear signal TX_CLR applied to the clear terminal CLR thereof from reception timing controller 58. Then, transmission amplifier 34 is turned off.

It can be appreciated from the foregoing descriptions that in the reception mode (i.e., MUX_SEL="1"), reception data latch 62 applies the reception gain control code to reception amplifier 36 and transmission data latch 60 is turned off, so as to prevent a deterioration of the reception sensitivity of the receiver due to an operation of transmission power amplifier 34, while the receiver receives the frame. On the contrary, in the transmission mode (i.e., MUX_SEL="0"), transmission data latch 60 applies the transmission gain control code to transmission power amplifier 34 and reception data latch 62 is turned off, so as to accurately control the gain during the transmission mode.

Further, referring to FIG. 7, a pulse width of the reception load clock signal RX_LD_CLK is wider than a pulse width of the transmission clear signal TX_CLR, in order to set the gain of reception amplifier 36 after completely turning off transmission power amplifier 34.

As described in the foregoing, the mobile radio communication terminal (a so-called cellular telephone) operating in the TDD mode according to the present invention employs the digital automatic gain control method instead of the conventional analog automatic gain control method. Therefore, it is easy to realize the automatic gain control device. Further, the transmission and reception gain can be accurately controlled based on the accurate timing control by the control processor. Besides, in the transmission mode, the reception data latch is cleared to turn off the reception amplifier, so as to prevent a distortion of a modulated transmission signal due to regeneration and coupling of the modulated transmission waveform generated from the receiver. On the contrary, in the reception mode, the transmission data latch is cleared to prevent the carrier generated from the transmitter from being leaked toward the receiver, thereby preventing deterioration of the reception sensitivity of the receiver.

It should be noted that the pulse width of the one-shot signals generated from the one-shot generators is variable in case of necessity. Further, although the gain control code is composed of four bits in the foregoing description, the bit numbers can be freely changed according to the present invention.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A digital automatic gain control device for use in a transmitting/receiving terminal of a mobile radio communication system, comprising:

a transmission power amplifier and a reception power amplifier, gains of said transmission power amplifier and reception power amplifier being digitally controlled;

a control processor for generating a digital transmission gain control signal of a next transmission frame based on transmission power level control information transmitted from a base station, and for setting a gain of said reception power amplifier for receiving a next reception frame after receiving one reception frame;

a received signal strength indication detector for detecting a received signal strength indication from said received reception frame;

an analog-to-digital converter for converting said received signal strength indication into a digital signal based on a sampling clock signal generated from said control processor;

a transmission gain control code mapping device for mapping said digital transmission gain control signal into a transmission gain control code for varying said gain of said transmission power amplifier;

a reception gain control code mapping device for mapping an output from said analog-to-digital converter into a reception gain control code for varying said gain of said reception power amplifier;

a selection controller for generating a selection control signal for selecting one of a transmission mode and a reception mode, based on a combination of timing signals and a multiplexing control clock signal generated from said control processor;

a multiplexer for selecting one of said transmission gain control code and said reception gain control code in response to said selection control signal;

a timing controller for generating transmission and reception timing control signals in response to further timing signals generated from the control processor;

a transmission data latch for receiving said transmission gain control code output by said multiplexer and for providing said transmission gain control code to said transmission power amplifier in response to said transmission timing control signal; and a reception data latch for receiving said reception gain control code from said multiplexer and for providing said reception gain control code to said reception power amplifier in response to said reception timing control signal.

2. The digital automatic gain control device as set forth in claim 1, wherein said control processor includes a timing generator for generating said timing signals, said timing generator comprising:

a first one-shot generator for generating a first end of reception frame signal in response to a falling edge of a receive recognition signal generated by said control processor upon reception of one reception frame, said receive recognition signal and said first end of reception frame signal being applied to said timing controller, and said receive recognition signal being further applied to said selection controller;

a second one-shot generator for generating a second end of reception frame signal in response to a falling edge of said first end of reception frame signal;

a first inverter for generating an inverted second end of reception frame signal in response to said second end of reception frame signal, said inverted second end of reception frame signal being applied to said timing controller;

a third one-shot generator responsive to a rising edge of said receive recognition signal for generating said sampling clock signal;

a second inverter for generating said multiplexing control clock signal by inverting said sampling clock signal;

a fourth one-shot for generating a pulse signal in response to a falling edge of a receive enable signal generated by said control processor, said receive enable signal being applied to said timing controller; and a third inverter for generating an inverted pulse signal in response to said pulse signal; said inverted pulse signal, said inverted pulse signal being applied to said selection controller.

3. The digital automatic gain control device as set forth in claim 2, wherein said selection controller comprises:

an AND gate having a first input terminal connected to receive said inverted pulse signal generated by said third inverter and a second input terminal connected to receive a reset signal;

a first D flip-flop having a preset terminal connected to receive said multiplexing control clock signal and a clear terminal connected to receive an output of said AND gate; and a second D flip-flop having a clear input terminal connected to a Q output terminal of said first D flip-flop, a data input terminal connected to a low logic level source, a clock terminal connected to receive said receive recognition signal and a Q output terminal for outputting said selection control signal.

4. The digital automatic gain control device as set forth in claim 2, wherein said timing controller comprises a transmission timing controller and a reception timing controller.

5. The digital automatic gain control device as set forth in claim 4, wherein said transmission timing controller comprises:

a first D flip-flop having a data input terminal connected to a high logic level source, a clock terminal connected to receive said receive recognition signal, a clear input terminal connected to receive a reset signal and a Q output terminal;

a second D flip-flop having a data input terminal connected to a low logic level source, a clock terminal connected to receive said first end of reception frame signal, a preset terminal connected to said Q output terminal of said first D flip-flop, and a Q output terminal;

an AND gate having a first input terminal connected to receive said reset signal and a second input terminal connected to receive said inverted second end of reception frame signal;

a third D flip-flop having a data input terminal connected to said high logic level source, a clock terminal connected to receive said receive enable signal, a clear input terminal connected to an output terminal of said AND gate and a Q output terminal;

an OR gate having a first input terminal connected to said Q output terminal of said second flip-flop and a second input terminal connected to said Q output terminal of said third D flip-flop;

a fifth one-shot generator responsive to a rising edge of said receive enable signal for generating a second pulse signal; and a fourth D flip-flop having a data input terminal connected to said high logic level source, a clock terminal connected to receive said second pulse signal, a clear input terminal connected to an output terminal of said OR gate and a Q output terminal for outputting an end of receive recognition signal, said end of receive recognition signal being applied to a clock terminal of said transmission data latch and to a clear input terminal of said reception data latch.

6. The digital automatic gain control device as set forth in claim 4, wherein said reception timing controller comprises:

a fifth one-shot generator for generating a reception load clock signal in response to a falling edge of a transmission enable signal generated by said control processor, said reception load clock signal being applied to a clock terminal of said reception data latch;

a sixth one-shot generator for generating a transmission enable clear signal in response to said falling edge of said transmission enable clear signal; and an exclusive OR gate having one input terminal connected to receive said reset signal and a second input terminal connected to receive said transmission enable clear signal, said exclusive OR gate generating a transmission clear signal, said transmission clear signal being applied to a clear input terminal of said transmission data latch.

7. The digital automatic gain control device as set forth in claim 5, wherein said reception timing controller comprises:

a sixth one-shot generator for generating a reception load clock signal in response to a falling edge of a transmission enable signal generated by said control processor, said reception load clock signal being applied to a clock terminal of said reception data latch;

a seventh one-shot generator for generating a transmission enable clear signal in response to said falling edge of said transmission enable clear signal; and an exclusive OR gate having one input terminal connected to receive said reset signal and a second input terminal connected to receive said transmission enable clear signal, said exclusive OR gate generating a transmission clear signal, said transmission clear signal being applied to a clear input terminal of said transmission data latch.

8. The digital automatic gain control device as set forth in claim 1, further comprising an output of said multiplexer being applied to an input of said control processor for feeding said digital transmission control code generated from said transmission gain control code mapping device back to said control processor for controlling said control processor to generate said digital transmission gain control signal of said next transmission frame, when said transmission power level control information is not transmitted from said base station.

9. A digital automatic gain control method for use in a transmitting/receiving terminal of a mobile radio communication system including a transmission power amplifier and a reception amplifier whose gains are digitally controlled, comprising the steps of:

generating a transmission gain control signal of a next frame based on transmission power level control information included in a signal received from a base station;

generating a plurality of timing signals for digitally controlling gains of said transmission power amplifier and said reception amplifier;

detecting a received signal strength indication of a received reception frame;

converting said received signal strength indication into a digitalized received signal strength indication signal in response to one of said timing signals;

mapping said transmission gain control signal into a transmission gain control code;

mapping the digitalized received signal strength indication signal into a reception gain control code;

selecting one of said transmission gain control code and said reception gain control code, in response to a number of said timing signals according to one of a transmission mode and a reception mode;

generating transmission timing control signals and reception timing control signals in response to a second number of said plurality of timing signals;

latching said transmission gain control code for output to control said gain of said transmission power amplifier in response to said transmission timing control signals and said reception timing control signals during said transmission mode; and latching said reception gain control code for output to control said gain of said reception power amplifier in response to said transmission timing control signals and said reception timing control signals during said reception mode.

10. The method as set forth in claim 9, further comprising a step of:

generating said transmission gain control signal of said next frame based on said digital transmission control code generated from said step of mapping said transmission gain control signal into said transmission gain control code, when said transmission power level control information is not included in said signal received from said base station.

11. A digital automatic gain control device for variably controlling gain of a transmission power amplifier and a reception power amplifier in a transmitting/receiving terminal of a mobile radio, comprising:

a control processor for generating a digital transmission gain control signal of a next transmission frame based on transmission power level control information transmitted from a base station and for generating a plurality of timing signals;

a received signal strength indication detector for detecting a received signal strength indication from said received reception frame;

an analog-to-digital converter for convelting said received signal strength indication into a digital received signal strength indication signal based on a sampling clock signal generated from said control processor;

a transmission gain control code mapping device for mapping said digital transmission gain control signal into a transmission gain control code;

a reception gain control code mapping device for mapping said digital received signal strength indication signal into a reception gain control code;

a multiplexer for selecting one of said transmission gain control code and said reception gain control code in response to a selection control signal;

a selection controller for generating said selection control signal based on a combination of a first number of said timing signals and a multiplexing control clock signal generated from said control processor;

a timing controller for generating transmission and reception timing control signals in response to a second number of said timing signals generated from said control processor;

a transmission data latch for receiving said transmission gain control code output by said multiplexer and for providing said transmission gain control code to a gain control terminal of said transmission power amplifier in response to said transmission and reception timing, control signals; and a reception data latch for receiving said reception gain control code from said multiplexer and for providing said reception gain control code to a gain control terminal of said reception power amplifier in response to said transmission and reception timing control signals.

12. The digital automatic gain control device as set forth in claim 11, wherein said control processor includes a timing generator for generating said plurality of timing signals, said timing generator comprising:

a first one-shot generator for generating a first end of reception frame signal in response to a falling edge of a receive recognition signal generated by said control processor upon reception of one reception frame, said receive recognition signal and said first end of reception frame signal being applied to said timing controller, and said receive recognition signal being further applied to said selection controller;

a second one-shot generator for generating a second end of reception frame signal in response to a falling edge of said first end of reception frame signal;

a first inverter for generating an inverted second end of reception frame signal in response to said second end of reception frame signal, said inverted second end of reception frame signal being applied to said timing controller;

a third one-shot generator responsive to a rising edge of said receive recognition signal for generating said sampling clock signal;

a second inverter for generating said multiplexing control clock signal by inverting said sampling clock signal;

a fourth one-shot for generating a pulse signal in response to a falling edge of a receive enable signal generated by said control processor, said receive enable signal being applied to said timing controller; and a third inverter for generating an inverted pulse signal in response to said pulse signal; said inverted pulse signal, said inverted pulse signal being applied to said selection controller.

13. The digital automatic gain control device as set forth in claim 12, wherein said selection controller comprises:

an AND gate having a first input terminal connected to receive said inverted pulse signal generated by said third inverter and a second input terminal connected to receive a reset signal;

a first D flip-flop having a preset terminal connected to receive said multiplexing control clock signal and a clear terminal connected to receive an output of said AND gate; and a second D flip-flop having a clear input terminal connected to a Q output terminal of said first D flip-flop, a data input terminal connected to a low logic level source, a clock terminal connected to receive said receive recognition signal and a Q output terminal for outputting said selection control signal.

14. The digital automatic gain control device as set forth in claim 12, wherein said timing controller comprises:

a first D flip-flop having a data input terminal connected to a high logic level source, a clock terminal connected to receive said receive recognition signal, a clear input terminal connected to receive a reset signal and a Q output terminal;

a second D flip-flop having a data input terminal connected to a low logic level source, a clock terminal connected to receive said first end of reception frame signal, a preset terminal connected to said Q output terminal of said first D flip-flop, and a Q output terminal;

an AND gate having a first input terminal connected to receive said reset signal and a second input terminal connected to receive said inverted second end of reception frame signal;

a third D flip-flop having a data input terminal connected to said high logic level source, a clock terminal connected to receive said receive enable signal, a clear input terminal connected to an output terminal of said AND gate and a Q output terminal;

an OR gate having a first input terminal connected to said Q output terminal of said second flip-flop and a second input terminal connected to said Q output terminal of said third D flip-flop;

a fifth one-shot generator responsive to a rising edge of said receive enable signal for generating a second pulse signal; and a fourth D flip-flop having a data input terminal connected to said high logic level source, a clock terminal connected to receive said second pulse signal, a clear input terminal connected to an output terminal of said OR gate and a Q output terminal for outputting an end of receive recognition signal, said end of receive recognition signal being applied to a clock terminal of said transmission data latch and to a clear input terminal of said reception data latch;

a sixth one-shot generator for generating a reception load clock signal in response to a falling edge of a transmission enable signal generated by said control processor, said reception load clock signal being applied to a clock terminal of said reception data latch;

a seventh one-shot generator for generating a transmission enable clear signal in response to said falling edge of said transmission enable clear signal; and an exclusive OR gate having one input terminal connected to receive said reset signal and a second input terminal connected to receive said transmission enable clear signal, said exclusive OR gate generating a transmission clear signal, said transmission clear signal being applied to a clear input terminal of said transmission data latch.

15. The digital automatic gain control device as set forth in claim 11, further comprising an output of said multiplexer being applied to an input of said control processor for feeding said digital transmission control code generated from said transmission gain control code mapping device back to said control processor for controlling said control processor to generate said digital transmission gain control signal of said next transmission frame, when said transmission power level control information is not transmitted from said base station.

* * * * *